United States Patent
Blandin (10) Patent No.: US 7,508,372 B2
(45) Date of Patent: Mar. 24, 2009

(54) TILT ROLLER FOR CONTROL DEVICE

(75) Inventor: Christian M. Blandin, Ballincollig (IE)

(73) Assignee: Logitech Europe S.A. (CH)

(*) Notice: Subject to any disclaimer, the term of this patent is extended or adjusted under 35 U.S.C. 154(b) by 734 days.

(21) Appl. No.: 10/976,431

(22) Filed: Oct. 29, 2004

(65) Prior Publication Data
US 2006/0092126 A1 May 4, 2006

(51) Int. Cl.
G09G 5/00 (2006.01)
(52) U.S. Cl. .................................... 345/156
(58) Field of Classification Search ............... None
See application file for complete search history.

(56) References Cited

U.S. PATENT DOCUMENTS

| | | | |
|---|---|---|---|
| 4,794,388 A | 12/1988 | Matthews | |
| 5,136,132 A | 8/1992 | Kitchen | |
| 5,446,481 A | 8/1995 | Gillick et al. | |
| 5,473,344 A | 12/1995 | Bacon et al. | |
| 5,530,455 A | 6/1996 | Gillick et al. | |
| 5,570,778 A | 11/1996 | Gernhardt et al. | |
| 5,659,334 A | 8/1997 | Yaniger et al. | |
| 5,883,619 A | 3/1999 | Ho et al. | |
| 5,912,661 A | 6/1999 | Siddiqui | |
| 6,075,518 A | 6/2000 | Pruchniak | |
| 6,204,838 B1 | 3/2001 | Wang et al. | |
| 6,340,966 B1 | 1/2002 | Wang et al. | |
| 6,587,093 B1 | 7/2003 | Shaw et al. | |
| 6,700,564 B2 | 3/2004 | McLoone et al. | |
| 6,798,397 B2 | 9/2004 | O'Keeffe et al. | |
| 7,079,110 B2 | 7/2006 | Ledbetter et al. | |
| 7,193,612 B2 | 3/2007 | Lindhout et al. | |
| 2002/0154090 A1 | 10/2002 | Lin | |
| 2002/0158844 A1 | 10/2002 | McLoone et al. | |
| 2003/0025673 A1* | 2/2003 | Ledbetter et al. | 345/163 |

FOREIGN PATENT DOCUMENTS

| | | |
|---|---|---|
| DE | 4405962 | 6/1995 |
| DE | 20300281 U1 | 4/2003 |
| EP | 0669715 | 8/1995 |
| EP | 1182606 A2 | 2/2002 |
| JP | 2002-366300 | 12/2002 |
| JP | 2003-022160 | 1/2003 |
| WO | WO 00/58819 A1 | 10/2000 |

OTHER PUBLICATIONS

The Standard Handbook of Machine Design/editors in chief, Joseph E. Shigley, Charles R. Mischke, 2nd ed., Copyright 1996 by The McGraw-Hill Companies, Inc., p. 41.2.

* cited by examiner

Primary Examiner—Sumati Lefkowitz
Assistant Examiner—Tammy Pham
(74) Attorney, Agent, or Firm—Townsend and Townsend and Crew LLP (57) ABSTRACT

A control device includes a roller configured to rotate and tilt; a roller support coupled to the roller, wherein the roller is configured to rotate relative to the roller support; the first hinge disposed adjacent to a first end of the roller support; and a second hinge disposed adjacent to a second end of the roller support, wherein the first end and the second end are substantially opposite ends of the roller support, the second hinge is above the first hinge, and the first hinge and the second hinge are configured to provide tilting support for the roller and roller support.

30 Claims, 6 Drawing Sheets

TILT ROLLER FOR CONTROL DEVICE

BACKGROUND OF THE INVENTION

The present invention relates to control devices, and more specifically relates to a tilting roller for a control device configured to control graphical objects displayed on a display.

The control device industry continues to strive to develop new control devices that are convenient to use and simple to manufacture. Moreover, the control device industry continues to strive to develop new control devices that provide scrolling control of graphical objects that are displayed on a display, such as a computer display, the display of a personal digital assistant, the display of a game device or the like. Traditional control devices, such as computer mice, provide scrolling control of graphical objects along the vertical axis of a display. The vertical scrolling directions on a display are typically referred to as the y-scrolling directions. More recent control devices provide both vertical scrolling control and horizontal scrolling control of graphical objects. The horizontal scrolling directions are typically referred to as the x-scrolling directions. Vertical-scrolling control and horizontal-scrolling control are often desired for scrolling graphical objects, such as a page of text, an image, video or the like, that extend beyond the vertical- and horizontal-display widths of a display so that these portions of the graphical objects may be conveniently scrolled for display. Even more recent control devices provide scrolling control of graphical objects for an axis that is perpendicular to the surface of a display. This axis is often referred to as the z-axis, and scrolling associated the z-axis is typically referred to as z-scrolling. Z-scrolling is often used for enlarging an image or shrinking an image (sometimes referred to as zooming in and zooming out on a graphical object) displayed on a display, and is sometimes used to show different z-axis cross-sections of a graphical object.

Other controllers configured to control scrolling of graphical objects include the controllers discussed in U.S. Pat. No. 5,446,481, filed Aug. 29, 1995, titled "Multidimensional Hybrid Mouse for Computers," owned by Mouse System Corporation, and in Patent Abstract of Japan, Publication No. 2002-366300, titled Mouse With Scroll Functions, owned by Toshiba Corp.

Microsoft published US Application No. 2003/0025673 shows a mouse with a wheel that is tiltable in a carriage and assembly carrier structure to provide horizontal scrolling in addition to the vertical scrolling from rotation of the wheel. This published application claims priority from published US Application No. 2002/0158844 that shows a scrolling wheel that slides laterally to provide for horizontal scrolling.

Gillick U.S. Pat. No. 5,446,481 shows a roller on a mouse that can be tilted to activate Z axis inputs. A number of other approaches have been taken to provide horizontal or a similar type of scrolling.

One approach is to provide a button near the scrolling wheel that switches the wheel from controlling vertical to horizontal scrolling. Examples are Gillick U.S. Pat. No. 5,530,455 and Toshiba published Japanese Application No. JP 2002366300.

The use of separate left and right scrolling buttons is shown, for example, in K. S. Cheng German published Application No. DE 20300281.

The use of a microstick, like a mini-joystick, on a mouse is shown in Yaniger U.S. Pat. No. 5,659,334, Synaptics U.S. Pat. No. 6,587,093, and Primax U.S. Pat. No. 6,204,838.

An optical sensor on the top of a mouse for sensing horizontal movement of a finger, in addition to vertical is shown in Agilient published European Application No. EP 1182606.

The use of two separate scrolling wheels on a mouse, one for vertical and another for horizontal movement is shown in Nippon published Japanese Application No. JP 2003022160.

A four-way button on a mouse for providing horizontal input is shown in Primax U.S. Pat. No. 5,883,619.

A saddle-shaped joystick on a mouse is shown in IBM published Application No. WO 200058819.

New control devices continue to be needed that provide control of graphical objects displayed on a display and that are easy to use and manufacture.

BRIEF SUMMARY OF THE INVENTION

A control device embodiment of the present invention includes a roller configured to rotate and tilt; a roller support coupled to the roller, wherein the roller is configured to rotate relative to the roller support; the first hinge disposed adjacent to a first end of the roller support; and a second hinge disposed adjacent to a second end of the roller support, wherein the first end and the second end are substantially opposite ends of the roller support, the second hinge is above the first hinge, and the first hinge and the second hinge are configured to provide tilting support for the roller and roller support. According to a specific embodiment of the present invention, the control device includes a top housing, wherein an axis of the front hinge and the back hinge substantially aligns with a portion of the top housing that is adjacent to the roller. According to another specific embodiment, the front hinge is configured to provide downward tilting support for the roller and roller support.

According to another specific embodiment, the back hinge includes a rib that is configured to couple to a housing, and a hinge support coupled to the roller support and having a substantially u-shaped opening formed therein, a surface of the hinge support that forms the opening is configured to couple to a distal end of the rib, and the hinge support is configured to rotate relative to the rib about the surface if the roller is laterally pushed.

According to another embodiment, a control device includes a housing having a slot formed in therein; a roller configured to rotate and tilt, wherein at least a portion of the roller extends through the slot; a roller support coupled to the roller, wherein the roller is configured to rotate relative to the roller support; the first hinge disposed adjacent to a first end of the roller support; and a second hinge disposed adjacent to a second end of the roller support, wherein: i) the wherein the first end and the second end are substantially opposite ends of the roller support, ii) the second hinge is above the first hinge, iii) the second hinge includes a hinge bar coupled to the housing and a hinge support coupled to the bar, and vi) the first hinge and the second hinge are configured to provide tilting support for the roller and roller support. According to a specific embodiment, a rotation axis of the front hinge and the back hinge is substantially aligned with a portion of the housing having the slot formed therein.

According to another embodiment, a control device includes a roller having a central hole formed therein and a set of protrusions positioned on an inner surface of the central hole; a ratchet support having a hole formed therein, wherein at least a portion of the ratchet support is positioned in the central hole, and wherein the roller is configured to rotate relative to the ratchet support; a spring device positioned in the hole; and a ratchet ball coupled to the spring, wherein the spring is configured to push the ratchet ball outward from the hole to couple the ratchet ball to the protrusions, and wherein the ratchet ball and the protrusions are configured to ratchet if the roller is rotated.

For a further understanding of the nature and advantages of the invention, reference should be made to the following description taken in conjunction with the accompanying drawings and claims.

DETAILED DESCRIPTION OF THE INVENTION

Figure 1A:
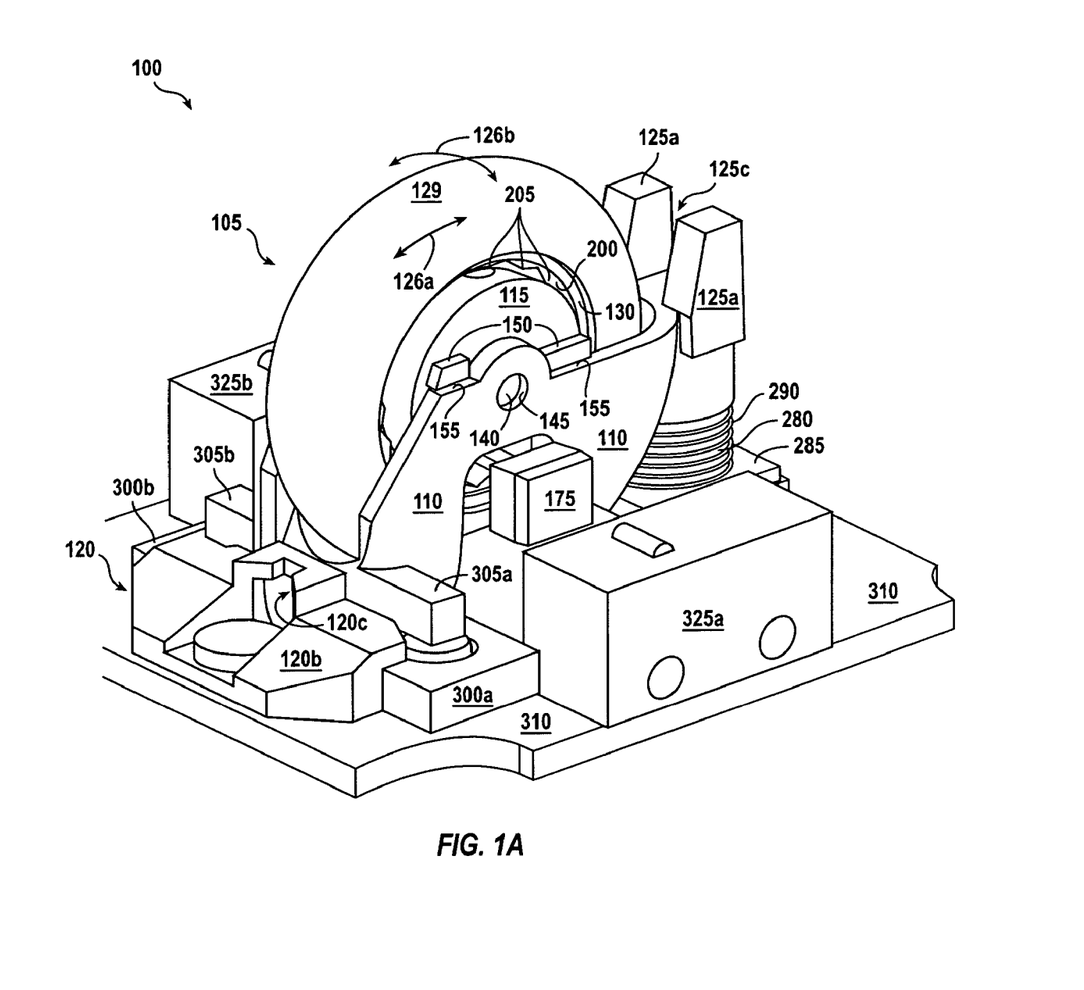
FIGS. 1A, 1B, and 1C are, respectively, a perspective view and cross-sectional views of a roller device according to one embodiment of the present invention.
Figure 1B:
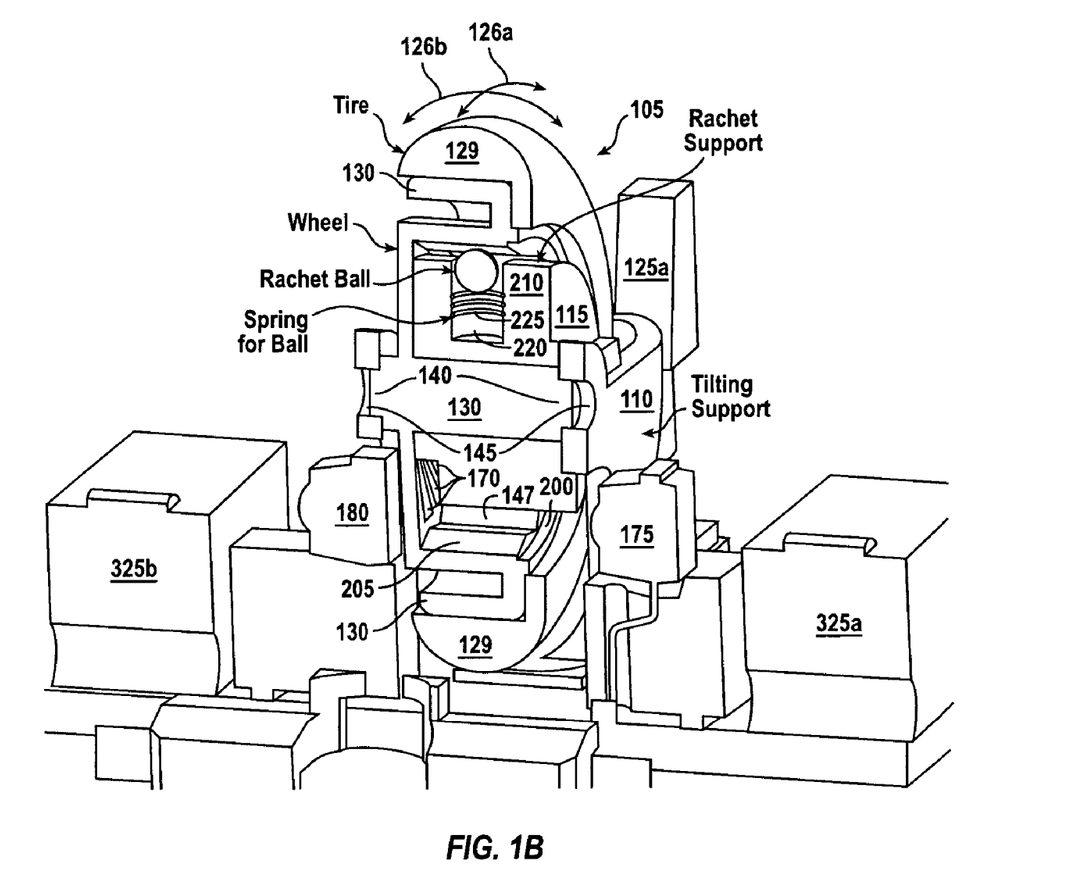
Figure 1C:
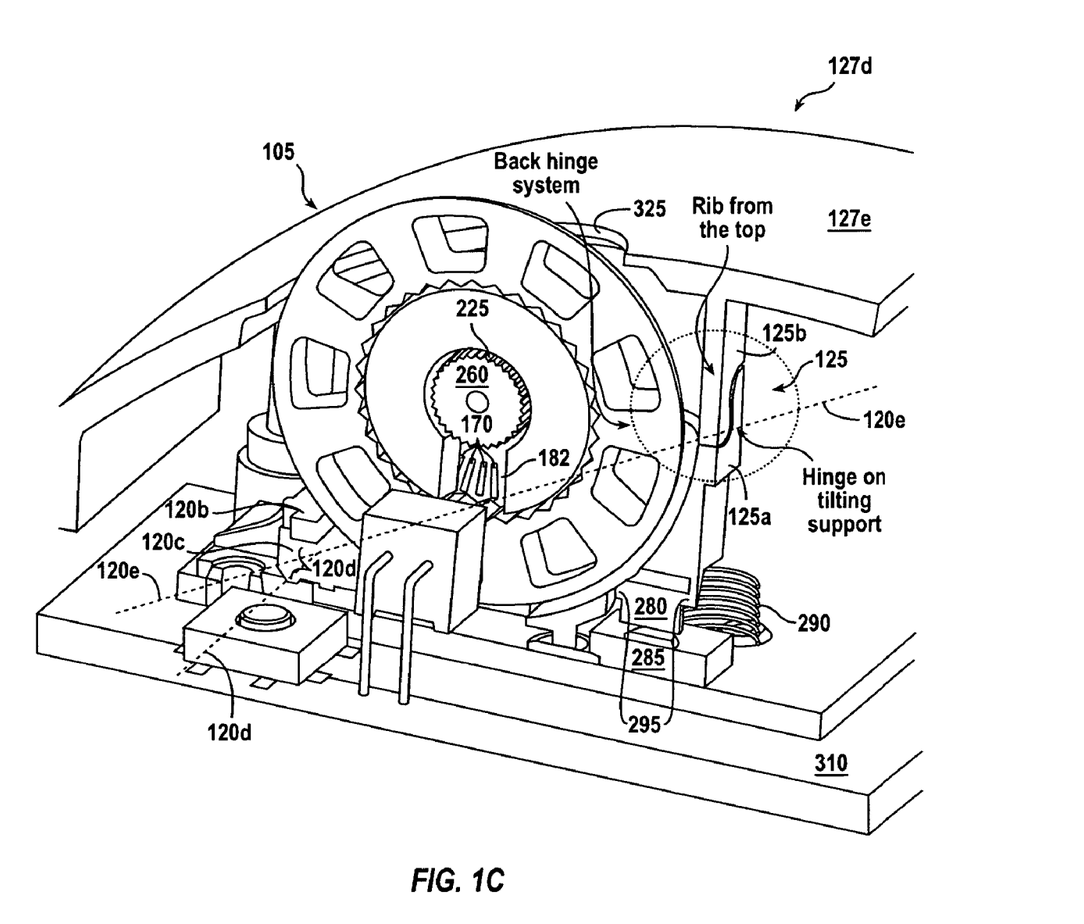

FIGS. 1A, 1B, and 1C are, respectively, a perspective view and cross-sectional views of a roller device 100 according to one embodiment of the present invention. Roller device 100 may include a roller 105, a roller support 110, a ratchet support 115, a front hinge 120, and a back hinge 125. Roller 105 may be rotated (indicated by arrow 126a) by a user to control vertical scrolling of a graphical object displayed on a display, and may be tilted (indicated by arrow 126b) to control horizontal scrolling of the graphical object. Vertical scrolling is sometimes referred to herein as y-scrolling, and horizontal scrolling is sometimes referred to herein as x-scrolling. A graphical object as referred to herein includes any object that may be displayed on a display, such as text, a window, an image (such as a picture, an electronic drawing or the like), video or the like. A display might include a computer monitor, a television (e.g., a television monitor or a traditional television), the display of a personal digital assistant, the display of a game device or the like.

Figure 2:
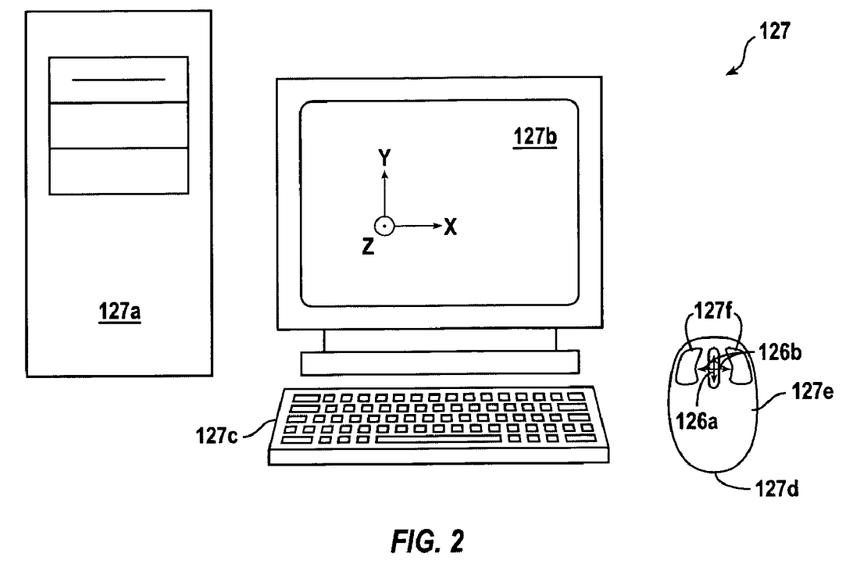
FIG. 2 is a simplified schematic of a computer system that includes a computer, a monitor, a first control device, and a second control device according to one embodiment of the present invention.

FIG. 2 is a simplified schematic of a computer system 127 that includes a computer 127a, a monitor 127b, a first control device 127c, and a second control device 127d. Control device 127d might be a mouse or a track ball that is configured to include roller device 100. The roller device might be rotated and tilted in the control device as indicated by arrows 126a and 126b respectively. While roller device 100 is described as forming a portion of control device 127d, control device 127c (e.g., a keyboard) might also be configured to include to the roller device. For convenience, the x, y, and z scrolling directions are indicated on the monitor. The z-axis extends perpendicularly from that plane of the page and is indicated, according to customary notation, as a dot in a circle. Control devices 127c and/or 127d may be hard wired or wireless devices.

Referring again to FIGS. 1A-1C, roller 105 includes a tire 129 and a wheel 130 that are configured to rotate relative to roller support 110 and ratchet support 115. Roller support 110 has a substantially solid-arc shape (i.e., the shape of a section of a disk) as viewed from the side of the roller support to substantially match a solid-arc portion of the roller that is configured to fit in an opening of the roller support. The roller may be held in the roller support by a set of roller pins 140 that are coupled to a central position of wheel 130. Roller pins 140 may be configured to fit in a set of apertures 145 that are formed in the roller support. The apertures are configured to support the roller pins, and the roller pins are configured to rotate relative to the apertures as the roller is rotated by a user.

Figure 3:
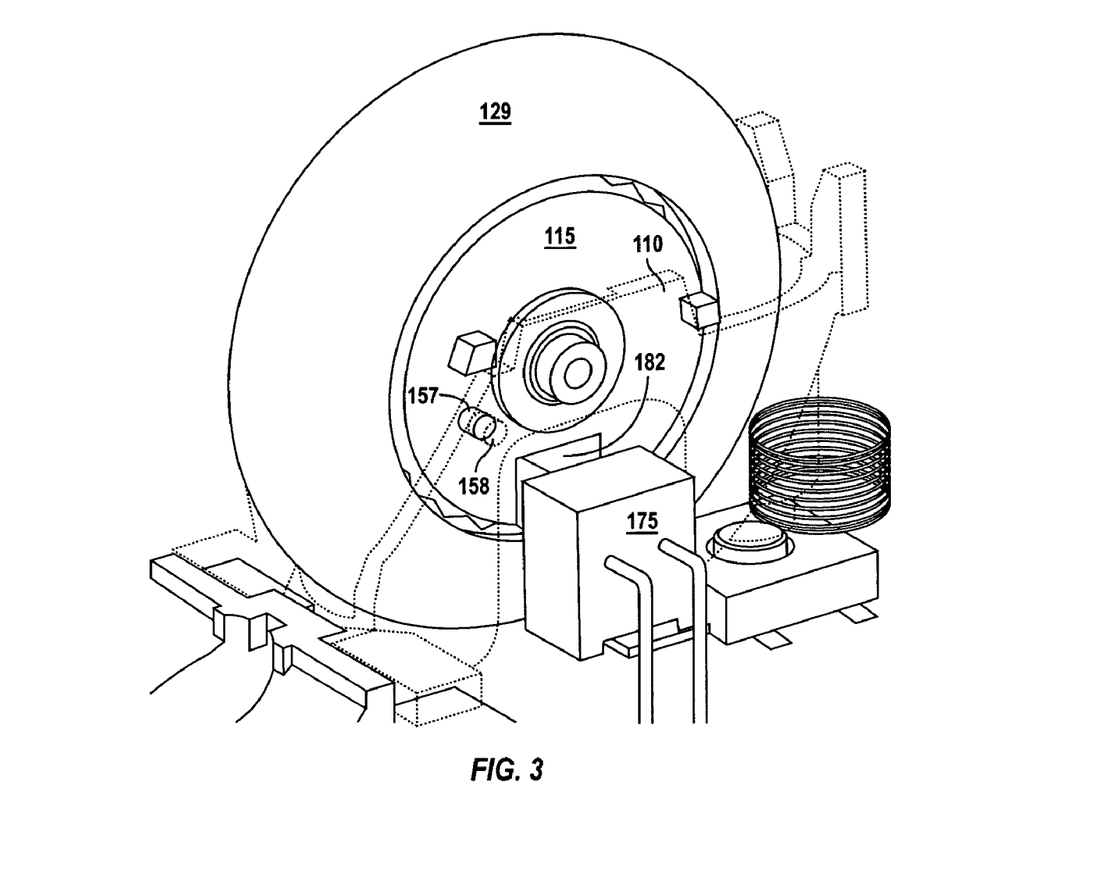
FIG. 3 is a perspective view of a portion of the roller device and shows the roller support in an outline view.

The ratchet support may be substantially fixed with respect to the roller and the roller support and may be at least partially disposed within a central opening 147 formed in the roller. The ratchet support may include a set of tabs 150 that is configured to contract the roller support, for example, at an upper surface 155 of the roller support such that the tabs are configured to prevent the ratchet support from rotating as the roller is rotated. FIG. 3 is a perspective view of a portion of the roller device and shows the roller support in an outline view. As shown in FIG. 3, the ratchet support may further include a pin 157 that is disposed in a hole 158 formed in the roller support such that the pin and hole are configured to provide further anti-rotational support of the ratchet support relative to the roller support.

Figure 4:
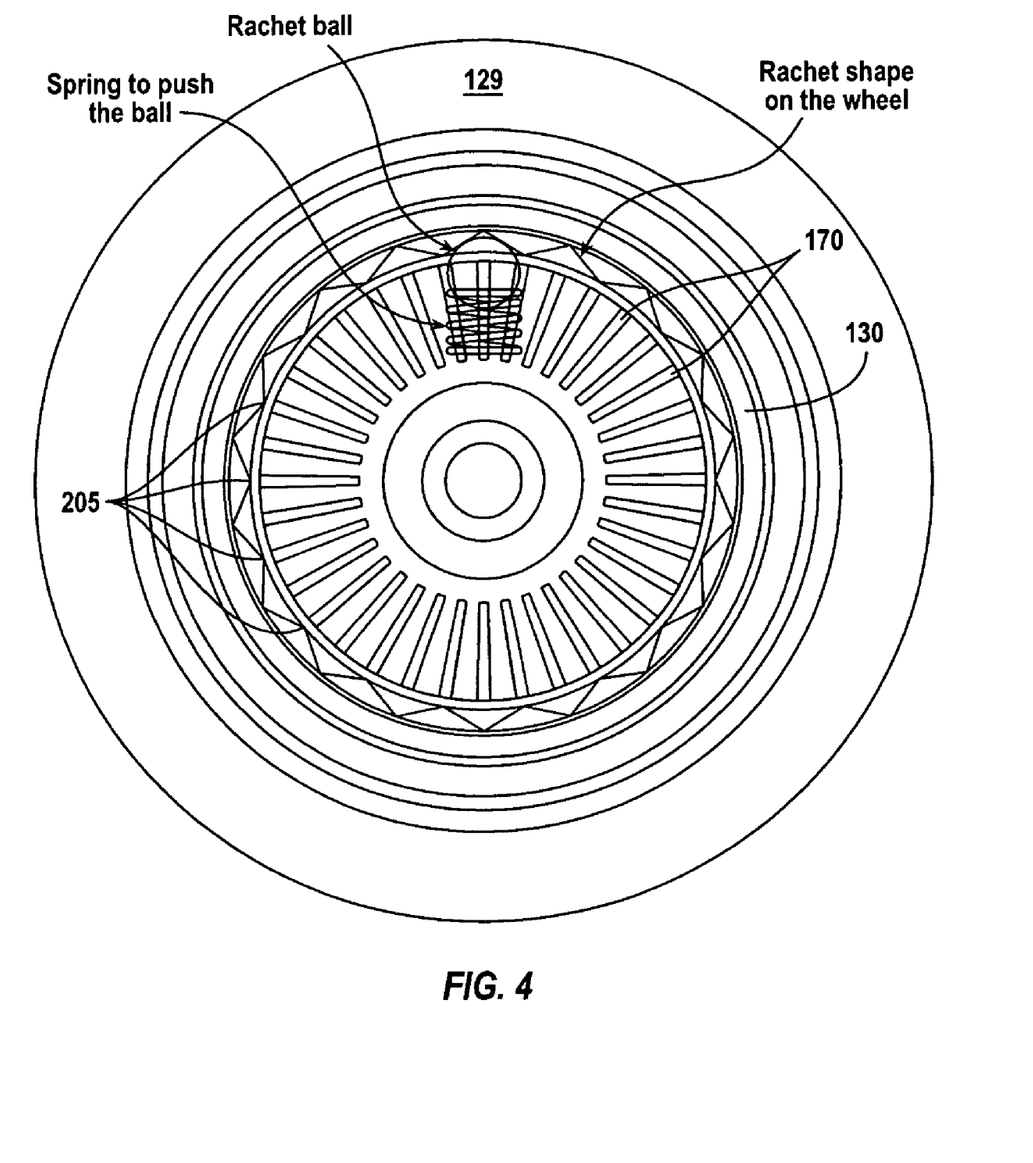
FIG. 4 is a side view of the roller according to one embodiment of the present invention.

Tire 129 may be coupled to wheel 130 or may be integrally formed with the wheel. The tire and wheel are be configured to rotate together (e.g., as a unit) as the tire is rotationally pushed by a user. Wheel 130 may include a set of encoder slots 170, wherein the encoder slots are configured to transmit light from a light source 175 to an optical encoder 180. Light source 175 might be a light emitting diode, a laser diode or the like. The encoder slots may be positioned substantially equidistance from one another around a circumference of wheel 130 as is shown in the side view of roller 105 in FIG. 4. Referring again to FIG. 3, ratchet support 115 may include a cutout 182 formed therein that is configured to permit the light to pass from the light source to the encoder slots. As the tire and wheel are rotated, the intensity of the light from the light source reaching the optical encoder increases and decreases. The optical encoder is configured to detect the increase and decrease of the intensity of the light, and use the intensity change to generate a set of encoder signals that encode the roller rotations. The encoder signals may be sent to a computer or the like, to control vertical scrolling of a graphical object displayed on a monitor of a computer.

Referring again to FIGS. 1A to 1C, an inner surface 200 of wheel 130 may include a set of protrusions 205. The protrusions may be triangular, rounded or the like, and may be configured to couple to (e.g., contract) a ratchet ball 210 to ratchet the roller as the roller is rotated by a user. The ratcheting of the ratchet ball and the protrusions provide tactile feedback to the user, via the tire, that informs the user that the roller has been rotated. A lower portion of the ratchet ball may be disposed in a hole 220 that is formed in ratchet support 115. An upper portion of the ratchet ball may extend from the hole to contact the protrusions to provide ratcheting as the tire is rotated. The central axis of hole 220 may substantially align with a radius of the ratchet support. The ratchet ball may be forced outward from the center of the ratchet support by a spring 225 that is disposed in the hole, and is positioned substantially below the ratchet ball to force the ratchet ball outward from the ratchet support.

Figure 5:
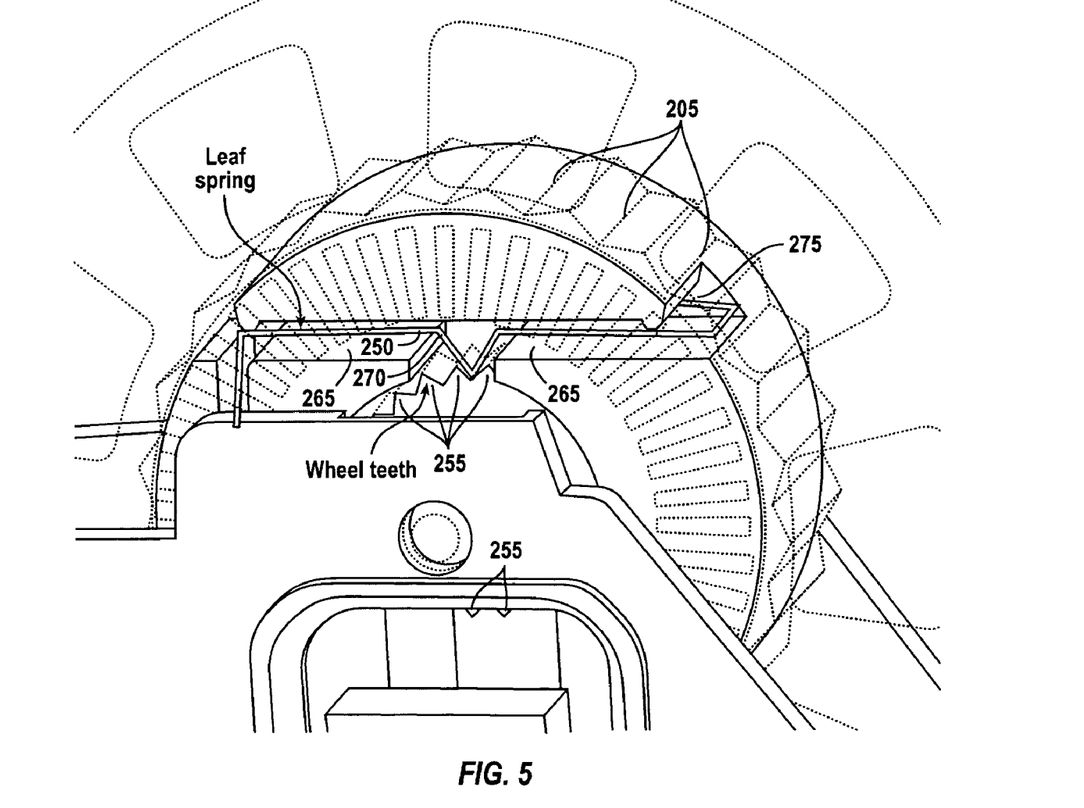
FIG. 5 is a perspective view of the roller device according to an another embodiment of the present invention.

FIG. 5 is a perspective view of a top portion of roller device 100 according to an alternative embodiment of the present invention. According to the alternative embodiment, ratcheting is provided by a spring 250 and a set of protrusions 255 that are disposed on a hub 260 of wheel 130. For convenience, the set of protrusions 255 are shown in the embodiment of the roller device that is shown in FIG. 1C. Spring 250 may be disposed in a slot 265 formed in the ratchet support and may be configured to contact the protrusions through an aperture 270 formed in the ratchet support. The spring and protrusions are configured to ratchet as the tire and the wheel are rotated by a user. According to another alternative embodiment, spring 250 is be configured to contact protrusions 205 through an aperture 275 formed in the ratchet support to provide ratcheting as the tire and the wheel are rotated.

According to one embodiment, roller 105 is configured to be pressed downward (e.g., "clicked") to activate a switch 285. Roller support 110 may include an arm 280 that is disposed on a back portion of the roller support and substantially above the switch 285 to activate switch 285 if the roller is pressed downward by a user. More specifically, the roller and roller support may be configured to rotate downward to activate switch 285 if the roller is pressed. The roller and roller support may be configured to rotate downward about a hinge axis 120a (which is indicated as a dashed line in FIG. 1C) of front hinge 120. Front hinge 120 may include a front-hinge support 120b and a rod 120c that is configured to pass through an aperture 120d formed in the front-hinge support. As roller 105 is pressed downward, rod 120c (and hence roller 105) is configured to rotate about hinge axis 120a while front-hinge support 120b remains substantially fixed. A spring 290 positioned toward the back of the roller support may be configured to provide an upward return force to the roller support as the roller is pressed downward. The spring may be positioned such that arm 280 is positioned within the central opening of the spring, and the spring may be configured to contact the upper surface of switch 285 and a shelf portion 295 of the roller housing to provide the return force.

Switch 285 may be a pancake switch or other type of switch and may provide a variety of functions associated with a roller click. For example, switch 285 in an activated state may be configured to change the mode operation of roller 105 from a first mode of operation to a second mode of operation. For example, the first mode of operation of roller 105 might be a y-scrolling mode (i.e., vertical scrolling mode) for graphical objects, and the second mode of operation might be a z-scrolling mode for graphical objects. The z-axis of a display includes an axis extending perpendicularly from the front of the display. Z-scrolling might include enlarging or reducing a graphical object that is displayed on the display, showing different z-axis cross-sections of the graphical object (e.g., if the graphical object is a three dimensional graphical object) or the like. The switch 285 might alternatively configure a position controller (not shown), such as a roller ball, track ball, optical sensor, or the like to change the mode of the position controller from a first mode of operation (e.g., a position-control mode) to a second mode of operation. The second mode of operation of the position controller might be a selection mode for selecting (e.g., highlighting) a graphical object (e.g., text, a graphic, etc) for scrolling the graphical object or the like.

As briefly described above, roller 105 and roller support 110 are configured to tilt, as indicated by arrow 126b, by a user pushing laterally on the roller. The roller device may include switches 300a and 300b that are configured to be activated if the roller is tilted right or left, respectively. The roller support might include an arm 305a that is coupled to the right side of the roller cage, and may be configured to activate switch 300a if the roller is tilted right. The roller support might also include and arm 305b that is coupled to the left side of the roller cage, and may be configured to activate switch 300b if the roller is tilted left. Switches 300a and 300b may be configured to control right scrolling and left scrolling, respectively, of a graphical object displayed on a display. Switch 285 may be configured to change the operation mode of switches 300a and 300b if switch 285 is activated (e.g., pressed and released or pressed and held). For example, if switch 285 is activated, the control mode of switches 300a and 300b may be changed from a first operation mode (e.g., a horizontal scrolling mode) to a second operation mode, wherein the second operation mode might include z-axis scrolling of a graphical object, selecting a graphical object (e.g., highlighting) for manipulation or the like.

According to one embodiment, switches 300a and 300b are configured to detect different amounts of force applied to the switches. For example, switches 300a and 300b might include piezoelectric devices or the like configured to detect the forces on the switches. The switches might be configured to scroll a graphical object at a rate that is associated with the force detected by the switches. For example, the switches might be configured to scroll a graphical object at a relatively high rate if a relatively high force is applied to the switches, and might be configured to scroll a graphical object a relatively low rate if a relatively low force is applied to the switches. The switch might be configured to control the rates of other modes of operation (z-axis scrolling mode) dependent on the forces detected by the switches.

According to one embodiment, front hinge 120 and back hinge 125 are configured to provide tilting support for the roller and roller support. The front hinge is positioned lower than the back hinge such that roller and roller support are configured to tilt about an axis 120e that is inclined with respect to the roller device. Axis 120e is indicated as a dashed line in FIG. 1C. Axis 120e passes substantially though the hinge points of the hinges. This axis is an inclined axis, for example, with respect to a button housing portion of housing 127e of mouse 127d, and may approximately align with the angle of inclination of top housing portion of housing 127e. The angle of inclination of the axis 127e may approximately match a comfortable use angle of a user's finger that laterally pushes on the roller. Alternatively, the angle of inclination of the axis 127e may approximately match the angle of a portion of the top housing that is adjacent to the roller. As described above front hinge 120 may include front-hinge support 120b and rod 120c. If a tilting force is applied to the roller, rod 120c might be configured to rotate in aperture 120d about axis 120e. Back hinge 125 might include a hinge support 125a and a rib 125b. Hinge support 125a may be coupled to the roller support, and may be integrally formed with the roller support. Rib 125b may be coupled to top housing 127e of a control device (e.g., mouse 127d, keyboard 127c, etc.), and may be integrally formed with the top housing. Hinge support 125a may have a "U" shape, and bar 125b may be configured to fit in the opening 125c of the hinge support. The bar and the hinge support may have curved surfaces or the like in a region at which the bar and the hinge support coupled to one another such that the bar and the hinge support can rotate (e.g., rock and/or slide) relative to one anther to provide hinge movement. The bar and hinge support may be configured to rotate relative to one another about axis 120e. According to one embodiment, spring 290 is configure to provide a return force to return the roller and roller support from a tilted position to an upright position as a user has stopped applying a lateral force to the roller.

Roller device 100 may be coupled to a printed circuit (PC) board 310 that is configured to transfer the control signal generated by the roller device to a computer or the like for controlling graphical objects displayed on a display or to control other functions associated with a computer or the like. The roller device and its associated PC boards may be coupled to a control device, such as a mouse, a keyboard, a joystick, a keypad, a game controller or the like. For example, roller device 100 may be coupled to a bottom portion of housing 127e of mouse 127d (or other device) and positioned at a front portion of the mouse (see FIG. 1C). Tire 129 may extend through an aperture 325 that is formed in a top portion of housing 127d for user access.

According to one embodiment, front hinge 120 has a relatively low profile. For example, front hinge 120 might have a height H of about 10 millimeters or less (see FIG. 1A). As front hinge 120 has a relatively low profile, the hinge is configured to be positioned adjacent to a front side of housing 315, wherein the front side of the housing forms the front portion of mouse 320.

According to one embodiment, roller device 100 further includes switches 325a and 325b that are disposed on opposite sides of the roller support on the PC board. The switches may be configured to be activated by buttons 127f or the like that might be coupled to housing 127e. The switches are configured to provide selection functions or the like that are associated with conventional mouse buttons.

It is to be understood that the examples and embodiments described above are for illustrative purposes only and that various modifications or changes in light thereof will be suggested to persons skilled in the art and are to be included within the spirit and purview of this application and scope of the appended claims. For example, while specific direction (up, down, front, back, left, right, etc) are used to in the foregoing description to refer to direction relative to the pages of the drawings, it should be understood that these directions are used as a matter of convenience. Therefore, it should be understood that while the specific directions are used to describe the roller device embodiments, the roller device may be mounted in a variety of configurations, such as mounted on the side of a control device for thumb use, on the sloping top of a keyboard or the like. Further, while the hole formed in the ratchet support is described as being substantially along a radius of the ratchet support the hole may lie at an non-zero angle with respect to the radius. Therefore, the above description should not be taken as limiting the scope of the invention as defined by the claims.

What is claimed is:

1. A control device comprising:
    a roller configured to rotate and tilt;
    a roller support coupled to the roller, wherein the roller is configured to rotate relative to the roller support;
    the first hinge disposed adjacent to a first end of the roller support;
    a second hinge disposed adjacent to a second end of the roller support, wherein the first end and the second end are substantially opposite ends of the roller support, the second hinge is above the first hinge, and the first hinge and the second hinge are configured to provide tilting support for the roller and roller support;
    a ratchet support having a hole formed therein, wherein at least a portion of the ratchet support is positioned in a central hole formed in the roller, and wherein the roller is configured to rotate relative to the ratchet support;
    a spring device positioned in the hole; and
    a ratchet ball coupled to the spring, wherein the spring is configured to push the ratchet ball outward from the hole to couple the ratchet ball to a set of protrusions positioned on an inner surface of the central hole, and wherein the ratchet ball and the protrusions are configured to ratchet if the roller is rotated.

2. The control device of claim 1, wherein the control device includes a top housing, wherein an axis of the front hinge and the back hinge substantially aligns with a portion of the top housing that is adjacent to the roller.

3. The control device of claim 1, wherein the front hinge is configured to provide downward titling support for the roller and roller support.

4. The control device of claim 1, wherein the roller support includes a central opening in which at least a portion of the roller is positioned.

5. The control device of claim 1, wherein the roller is configured to rotate and laterally tilt to control, respectively, vertical scrolling and horizontal scrolling of a graphical object displayed on a display.

6. The control device of claim 1, wherein:
    the front hinge includes front-hinge support and a rod, the front hinge support having an aperture formed therein configured to receive the rod,
    the rod is configured to rotate within the aperture to provide lateral tilting support for the roller support if the roller is pushed laterally, and
    the rod is configured to pivot downward to provide downward tilting support if the roller is pushed downward.

7. The control device of claim 1, wherein:
    the back hinge includes a rib that is configured to couple to a housing, and a hinge support coupled to the roller support and having a substantially u-shaped opening formed therein,
    a surface of the hinge support that forms the opening is configured to couple to a distal end of the rib, and
    the hinge support is configured to rotate relative to the rib about the surface if the roller is laterally pushed.

8. The control device of claim 7, wherein the distal end of the rib has a first curved shape and the surface has a second curved shape that is complimentary to the first curved shape.

9. The control device of claim 1, wherein the front hinge has a height of about 10 millimeters or less.

10. The control device of claim 1, further comprising a spring positioned adjacent to the second end of the roller support and configured to provide a return force to the roller and the roller support if the roller is pushed laterally or pushed down.

11. The control device of claim 1, wherein the hole has a central axis that is substantially aligned with a radius of the ratchet support, and wherein an opening of the hole is adjacent to the protrusions.

12. The control device of claim 1, further comprising:
    an encoder configured to encode rotations of the roller to control vertical scrolling of a graphical object displayed on a display;
    a first switch and a second switch that are configured to detect lateral forces on the roller to control lateral scrolling of a graphical object displayed on a display; and
    a third switch configured to detect downward forces on the roller to change a mode operation of the first switch, the second switch, and/or the encoder.

13. A control device comprising;
    a roller having a central hole formed therein and a set of protrusions positioned on an inner surface of the central hole;
    a ratchet support having a hole formed therein, wherein at least a portion of the ratchet support is positioned in the central hole, and wherein the roller is configured to rotate relative to the ratchet support;
    a spring device positioned in the hole; and
    a ratchet ball coupled to the spring, wherein the spring is configured to push the ratchet ball outward from the hole to couple the ratchet ball to the protrusions, and wherein the ratchet ball and the protrusions are configured to ratchet if the roller is rotated.

14. The control device of claim 13, wherein the hole has a central axis that is substantially aligned with a radius of the ratchet support, and wherein an opening of the hole is adjacent to the protrusions.

15. The control device of claim 13, further comprising an encoder configured to encode rotations of the roller to control vertical scrolling of a graphical object displayed on a display.

16. The control device of claim 13, further comprising a roller support having a central opening, wherein at least a portion of the roller is positioned in the central opening of the roller support, wherein the roller is supported by the roller support and configured to rotate relative to the roller support.

17. The control device of claim 16, wherein the roller support includes a set of apertures coupled to a set of roller pins of the roller to rotationally couple the roller to the roller support.

18. The control device of claim 16, wherein the ratchet support includes at least one tab coupled to the roller support, the tab being configured to inhibit rotation of the ratchet support relative to the roller support.

19. The control device of claim 16, further comprising a front hinge and a back hinge that are coupled, respectively, to a front portion of the roller support and a back portion of the roller support, wherein the roller and roller support are configured to tilt laterally on the front hinge and the back hinge if the roller is pushed laterally, and wherein the roller and roller support are configured to tilt down on the front hinge if the roller is pushed down.

20. The control device of claim 19, wherein:
the front hinge includes a front-hinge support and a rod, the front hinge support having an aperture formed therein configured to receive the rod,
the rod is configured to rotate within the aperture to provide lateral tilting support if the roller is pushed laterally, and
the rod is configured to provide downward tilting support if the roller is pushed downward.

21. The control device of claim 19, wherein:
the back hinge includes a hinge support coupled to a rib, the hinge support is coupled to the roller support,
the rib is configured to couple to a housing of a control device, and
the hinge support is configured to rotate relative to the rib if the roller is laterally pushed.

22. The control device of claim 19, further comprising a spring positioned adjacent to the back hinge and configured to provide a return force to the roller and the roller support if the roller is laterally pushed or pushed down.

23. The control device of claim 19, and the second hinge is above the first hinge.

24. The control device of claim 23, wherein a tilting axis of the roller is an inclined axis.

25. The control device of claim 19, wherein the front hinge has a height of about 10 millimeters or less.

26. The control device of claim 19, further comprising a switch configured to be activated if the roller is pressed down.

27. The control device of claim 19, further comprising a first switch disposed adjacent to a first side of the roller support; and a second switch disposed adjacent to a second side of the roller support that is positioned opposite to the first side, wherein the first switch is configured to be activated if the roller is laterally pushed toward the first switch, and the second switch is configured to be activated if the roller is laterally pushed toward the second switch.

28. The control device of claim 27, wherein the roller support includes a first arm configured to overlie the first switch and activate the first switch if the roller is laterally pushed toward the first switch, and the roller support includes a second arm configured to overlie the second switch and activate the second switch if the roller is laterally pushed toward the second switch.

29. The control device of claim 27, wherein, in respective activated states, the first and second switches are configured to control lateral scrolling of a graphical object.

30. The control device of claim 13, wherein the control device is a mouse.

\* \* \* \* \*